United States Patent
Ito

(10) Patent No.: US 7,941,473 B2
(45) Date of Patent: May 10, 2011

(54) CALCULATION APPARATUS AND STORAGE MEDIUM IN WHICH CALCULATION PROGRAM IS STORED

(75) Inventor: Hisashi Ito, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 1076 days.

(21) Appl. No.: 11/729,651

(22) Filed: Mar. 29, 2007

(65) Prior Publication Data
US 2007/0233771 A1    Oct. 4, 2007

(30) Foreign Application Priority Data

Mar. 31, 2006 (JP) ................................. 2006-098331

(51) Int. Cl.
*G06F 11/10* (2006.01)
(52) U.S. Cl. ....................................... 708/530; 708/164

(58) Field of Classification Search .................. 708/164, 708/530
See application file for complete search history.

(56) References Cited

U.S. PATENT DOCUMENTS 4,190,892 A * 2/1980 Ebihara et al. ............... 708/166
4,224,677 A * 9/1980 Kindell et al. ............... 708/211

FOREIGN PATENT DOCUMENTS
JP    2000-322238 A    11/2000

* cited by examiner

*Primary Examiner* — Chuong D Ngo
(74) *Attorney, Agent, or Firm* — Holtz, Holtz, Goodman & Chick, PC

(57) ABSTRACT

In a graphing calculator, a decimal calculation unit obtains a calculation result of an arithmetic expression input by an input device to an n-th digit and an (n+m)-th digit. When the values from the most significant digit to an (n+1)-th digit in the (n+m)-digit calculation result are zero, with respect to an addition or subtraction, the CPU corrects an n-digit calculation result of the addition or subtraction to zero.

6 Claims, 13 Drawing Sheets

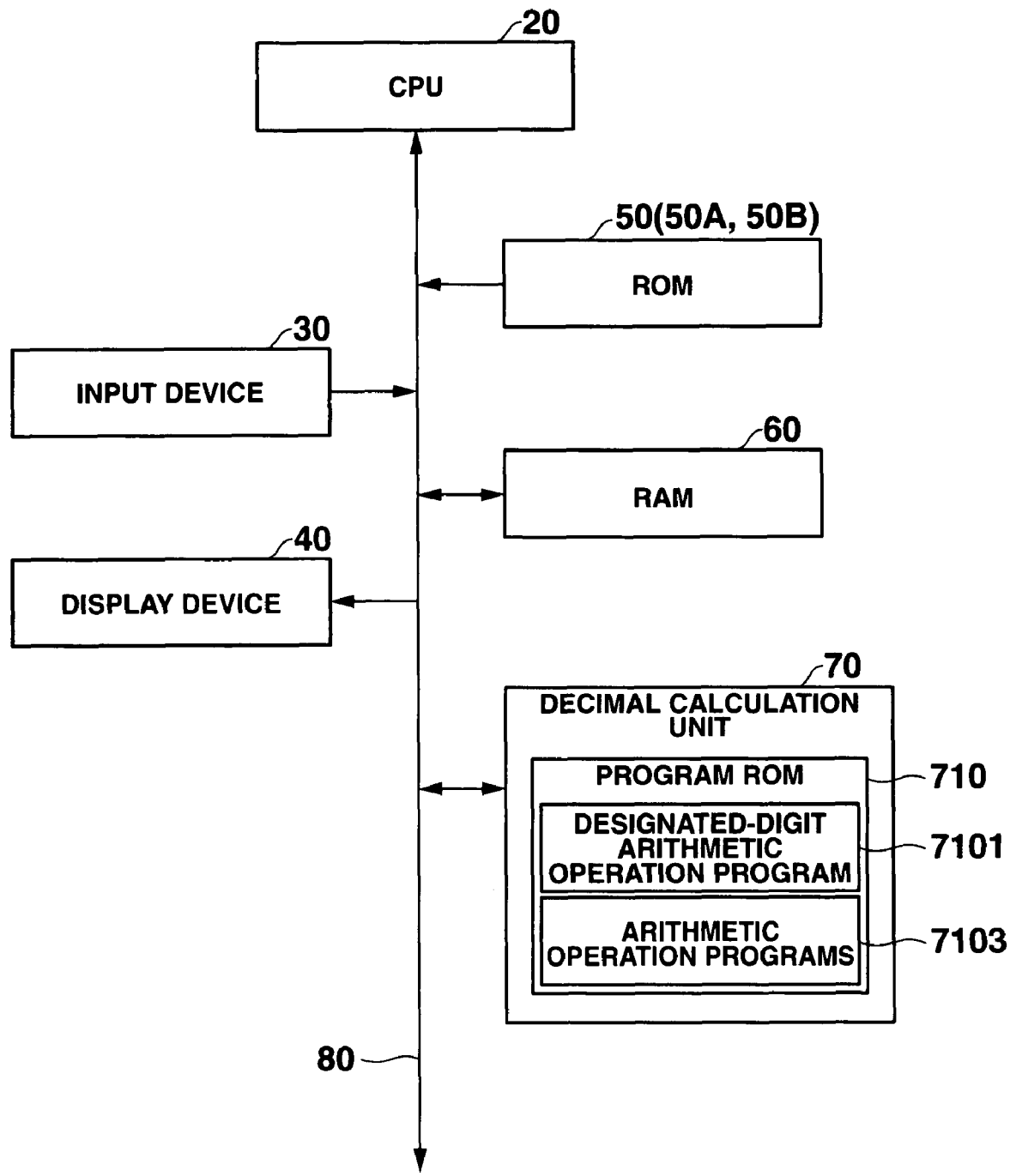

FIG.7A

EXPRESSION: $3 \times \sqrt{7} - \sqrt{63}$ (DIGIT-NUMBER: 7)   = 7. 937253
                    −7. 937254
                    = −0. 000001        (AFTER SUBTRACTION)
                    = −1E−6

(DIGIT-NUMBER: 11)  = 7. 9372539333
                    −7. 9372539332
                    = 0. 0000000001    (AFTER SUBTRACTION)
                    = 1E−10

CALCULATION RESULT = 0

FIG.7B

EXPRESSION: $1 - 1 \div 3 \times 3$ (DIGIT-NUMBER: 7)   = 1 −0. 9999999
                    = 0. 0000001       (AFTER SUBTRACTION)
                    = 1E−7

(DIGIT-NUMBER: 11)  = 1 −0. 99999999999
                    = 0. 00000000001   (AFTER SUBTRACTION)
                    = 1E−11

CALCULATION RESULT = 0

FIG.7C

EXPRESSION: $1 - 0.9999999$ (DIGIT-NUMBER: 7)   = 1 −0. 9999999
                    = 0. 0000001       (AFTER SUBTRACTION)
                    = 1E−7

(DIGIT-NUMBER: 11)  = 1 −0. 9999999
                    = 0. 00000010000   (AFTER SUBTRACTION)
                    = 1E−7

⇒ 0. 00000010000   (AFTER ADDITION OF +1)
                    OR 0. 00000009999   (AFTER ADDITION OF −1)

CALCULATION RESULT = 1E−7

FIG.8A

EXPRESSION: cosx (x = 3.141593)

(DIGIT-NUMBER: 15) = −9.99999999999940E−01

(DIGIT-NUMBER: 19) = −9.999999999994000000E−01

FIG.8B

EXPRESSION: 1+cosx (x = 3.141593)

(DIGIT-NUMBER: 15) = 0.000000000000060
= 6.0E−14

(DIGIT-NUMBER: 19) = 0.0000000000000600000
= 6.00000E−14

⇒ 0.0000000000000600001 (AFTER ADDITION OF +1)
= 6.00001E−14

FIG.8C

EXPRESSION: (1+cosx)/x (x = 3.141593)

(DIGIT-NUMBER: 15) = 1.90985910651061E−14

(DIGIT-NUMBER: 19) = 1.909862289609125052E−14

FIG.8D

CALCULATION RESULT = 1.90986E−14

FIG.9A

EXPRESSION: 1+cosx   (x = 3.141593)

(DIGIT-NUMBER: 15)   = 0. 000000000000060
                    = 6. 0E−14

(DIGIT-NUMBER: 19)   = 0. 0000000000000600000

⇒ 0. 0000000000000599999 (AFTER ADDITION OF −1)
                    = 5. 99999E−14

FIG.9B

EXPRESSION:   (1+cosx) / x   (x = 3.141593)

(DIGIT-NUMBER: 15)   = 1. 90985910651061E−14

(DIGIT-NUMBER: 19)   = 1. 9098559234121 0335E−14

FIG.9C

CALCULATION RESULT = 1. 90986E−14

FIG.10A

EXPRESSION: √5 − 2.2360

(DIGIT-NUMBER: 7)    = 0. 000067

(DIGIT-NUMBER: 11)   = 0. 0000679774

⇒ 0. 0000679775   (AFTER ADDITION OF +1)

FIG.10B

CALCULATION RESULT = 0. 000068

FIG.12A

```
EXPRESSION:   sin(π×99)

(DIGIT-NUMBER: 7)    = sin(3.141593×99)
                       = sin(311.0177)
                       = -2.733999E-5

(DIGIT-NUMBER: 11)   = sin(3.1415926535×99)
                       = sin(311.01767271)
                       = -4.6139999999E-9
```

FIG.12B $$|-2.733999E-5| \times 1E-3 \geq |-4.6139999999E-9|$$

FIG.12C

CALCULATION RESULT = 0

FIG.14A

```
EXPRESSION:   3×√7-√63

(DIGIT-NUMBER: 7)    =   7. 937253
                        -7. 937254
                     = -0. 000001
                     = -1E-6

(DIGIT-NUMBER: 11)   =   7. 9372539333
                        -7. 9372539332
                     =   0. 0000000001
                     =   1E-10
```

FIG.14B

```
EXPRESSION: 1 - 1 ÷ 3 × 3

(DIGIT-NUMBER: 7)    =   1
                        -0. 9999999
                     =   0. 0000001
                     =   1E-7

(DIGIT-NUMBER: 11)   =   1
                        -0. 99999999999
                     =   0. 00000000001
                     =   1E-11
```

FIG.15A

| | | |
|---|---|---|
| EXPRESSION: | 1+cosx | (x = 3.141593) |
| (DIGIT-NUMBER: 15) | = 6.0E−14 | |
| (DIGIT-NUMBER: 19) | = 6.00000E−14 | |
| (DIGIT-NUMBER: 23) | = 6.000001567E−14 | |

FIG.15B

| | | |
|---|---|---|
| EXPRESSION: | (1+cosx)/x | (x = 3.141593) |
| (DIGIT-NUMBER: 15) | = 1.90985910651061E−14 | |
| (DIGIT-NUMBER: 19) | = 1.9098591065106 14201E−14 | |
| (DIGIT-NUMBER: 23) | = 1.9098596053021508514948E−14 | |

FIG.15C

| | | |
|---|---|---|
| EXPRESSION: | (1+cosx)/x | (x = 3.141593) |
| (DIGIT-NUMBER: 15) | = 1.90985910651061E−14 | |
| (DIGIT-NUMBER: 19) | = 1.909860E−14 | |

CALCULATION APPARATUS AND STORAGE MEDIUM IN WHICH CALCULATION PROGRAM IS STORED

CROSS-REFERENCE TO RELATED APPLICATIONS

This application is based upon and claims the benefit of priority from prior Japanese Patent Application No. 2006-098331, filed Mar. 31, 2006, the entire contents of which are incorporated herein by reference.

BACKGROUND OF THE INVENTION

1. Field of the Invention

The present invention relates to a calculation apparatus which executes multi-digit numerical calculation, and a storage medium in which a calculation program is stored.

2. Description of the Related Art

A conventional calculation apparatus can perform a floating point operation.

The conventional calculation apparatus employs the ANSI/IEEE 754-1958 standard ("IEEE 754") or the like as an arithmetic standard. The conventional calculation apparatus uses a large number of digits for a precise floating point operation.

A subtraction between equivalent numerals, such as "$3 \times \sqrt{7} - \sqrt{63}$" or "$1 - 1 \div 3 \times 3$", must result in zero. However, as shown in FIGS. 14A and 14B, there may be a case in which the conventional calculation apparatus does not derive zero from the subtraction, even when arithmetic precision is improved by the rise of the number of digits used for the subtraction.

Further, a subtraction between very close numerals may result in extreme loss of significant digits owing to restriction on the number of digits, that is, the "cancellation" of the significant digits is brought about. In the case where the significant digits are cancelled, even when the result of the subtraction itself has almost no error, an error resulting from the cancellation may propagate and increase through subsequent calculations. For example, as shown in FIG. 15A, the values of "$1 + \cos x$", for $x = 3.141593$, obtained to a "15th" digit and a "19th" digit, take an equivalent value, even though several significant digits are lost. However, when the calculation results of "$1 + \cos x$" are used for calculating "$(1 + \cos x)/x$", as shown in FIG. 15B, the calculation result obtained to the 15th digit is "$1.90985910651061E-14$", while the calculation result obtained to the 19th digit is "$1.909859106510614201E-14$". The more number of digits are cancelled, the error becomes more significant. Moreover, as shown in FIG. 15C, rounding-off correction is performed such that the calculation result obtained to the 15th digit is rounded off using the calculation result obtained to the 19th digit, and the calculation result obtained to the 19th digit is rounded off using a calculation result obtained to a "23rd" digit. The rounded 15-digit calculation result is "$1.90985910651061E-14$", and the rounded 19-digit calculation result is "$1.909860E-14$". The rounding-off correction derives much more significant errors.

BRIEF SUMMARY OF THE INVENTION

An object of the present invention is to provide a calculation apparatus and a calculation program which enable to improve the arithmetic precision.

According to an embodiment of the present invention, a calculation apparatus comprises:

an input device configured to input a first number of digits and an arithmetic expression which includes at least one calculation;

a calculator configured to execute a calculation included in the arithmetic expression input by the input device to obtain first and second calculation results of the first number of digits and a second number of digits which is larger than the first number of digits;

a detection unit configured to detect that the calculation executed by the calculator is an addition or a subtraction; and a zero correction unit configured to perform a zero correction such that the first calculation result is corrected to zero when the detection unit detects that the calculation is an addition or a subtraction and values of predetermined upper digits of the second calculation result are zero.

According to another embodiment of the invention, a calculation apparatus comprises:

an input device configured to input a first number of digits and an arithmetic expression which includes at least one calculation;

a calculator configured to execute a calculation included in the arithmetic expression input by the input device to obtain first and second calculation results of the first number of digits and a second number of digits which is larger than the first number of digits; and a zero correction unit configured to perform a zero correction such that the first calculation result is corrected to zero when an absolute value of the second calculation result is smaller than a product of an absolute value of the first calculation result and a predetermined coefficient.

According to another embodiment of the invention, a calculation apparatus comprises:

an input device configured to input a first number of digits and an arithmetic expression which includes at least one calculation;

a calculator configured to execute a calculation included in the arithmetic expression input by the input device to obtain first and second calculation results of the first number of digits and a second number of digits which is larger than the first number of digits;

a detection unit configured to detect that the calculation executed by the calculator is an addition or a subtraction;

a least significant digit correction unit configured to perform a least significant digit correction such that a least significant digit of the second calculation result is corrected by $\pm 1$ when the detection unit detects that the calculation is an addition or a subtraction, the second calculation result is not zero, and a most significant digit of the second calculation result is zero.

BRIEF DESCRIPTION OF THE SEVERAL VIEWS OF THE DRAWING

FIG. 2 is a schematic block diagram showing an electric configuration of the graphing calculator 1;

FIGS. 7A, 7B, 7C, 8A, 8B, 8C, 8D, 9A, 9B, 9C, 10A, and 10B are diagrams conceptually showing an internal process executed by the graphing calculator according to the first embodiment;

FIGS. 12A, 12B, and 12C are diagrams conceptually showing an internal process executed by the graphing calculator according to the second embodiment;

FIGS. 14A, 14B, 15A, 15B, and 15C are diagrams conceptually showing an internal process executed by a conventional calculation apparatus.

DETAILED DESCRIPTION OF THE INVENTION

Two embodiments of a calculation apparatus according to the present invention which is applied to a graphing calculator will now be described with reference to the accompanying drawings.

Common Configuration

An explanation will be given below of general configuration of the graphing calculators of the embodiments.

Figure 1:
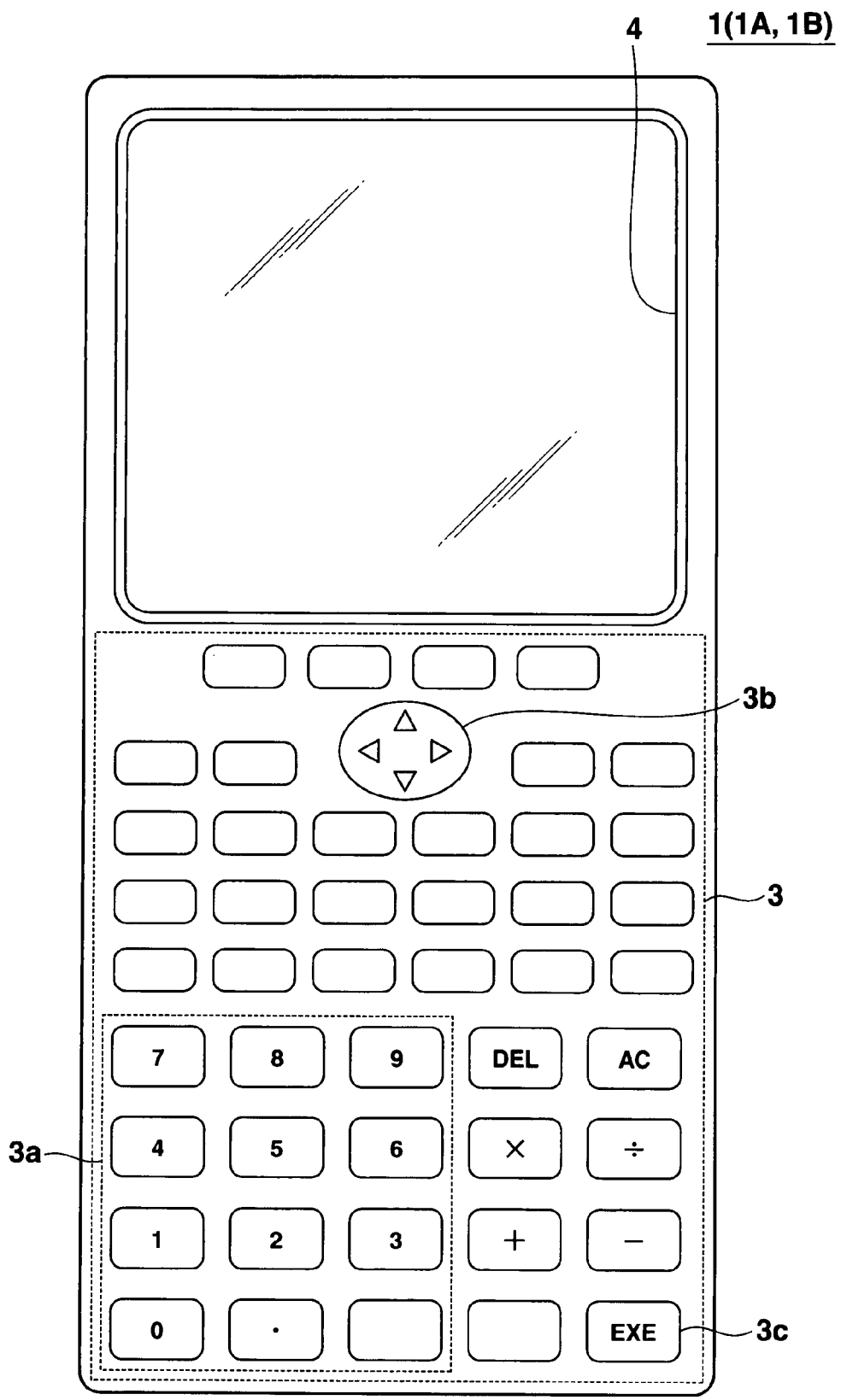
FIG. 1 is a schematic diagram of a graphing calculator 1.

FIG. 1 is a schematic diagram of a graphing calculator 1. As shown in FIG. 1, the graphing calculator 1 is provided with a key group 3 and a display 4.

The key group 3 includes keys to be operated by a user, such as numeral keys 3a, a direction key 3b, and an execution (EXE) key 3c.

The user inputs a numeral by the numeral keys 3a. The user operates the direction key 3b to shift a cursor or to select a function in a function menu. The direction key 3b can indicate direction upward, downward, leftward, and rightward. The user operates the EXE key 3c to determine or execute processing.

The display 4 is a liquid crystal display (LCD), for example. The display 4 displays data or a graph in response to depression of a key of the key group 3.

FIG. 2 is a schematic block diagram showing an electric configuration of the graphing calculator 1. As shown in FIG. 2, the graphing calculator 1 includes a central processing unit (CPU) 20, an input device 30, a display device 40, a read-only memory (ROM) 50, a random access memory (RAM) 60, and a decimal calculation unit 70. The components of the graphing calculator 1 are connected to each other via a bus line 80 for data communication.

The input device 30 includes the key group 3 and outputs a signal to the CPU 20 according to the key operation. The key group 3 may be replaced by, for example, a touch panel.

Figure 3A:
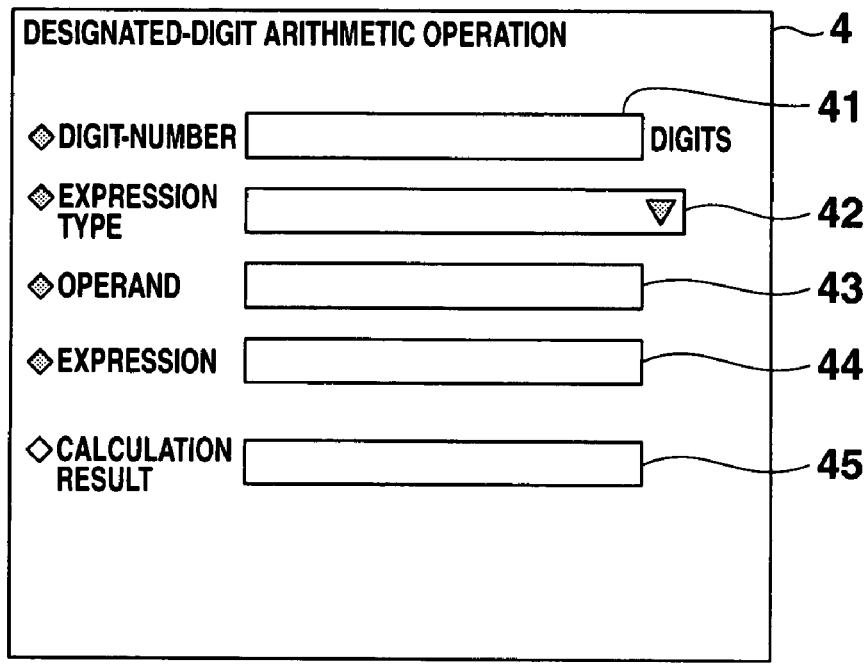
FIG. 3A is a diagram showing an example of an image displayed by a display device 4.

The display device 40 is equipped with the display 4. The display device 40 displays various images based on a variety of signals input from the CPU 20. When the user instructs execution of an arithmetic operation to a designated digit, the display device 40 displays a variety of boxes for inputting an arithmetic expression to be operated, as shown in FIG. 3A.

The user can input the arithmetic expression to be operated using the input device 3. The input arithmetic expression may be divided into one or more calculations.

Figure 3B:
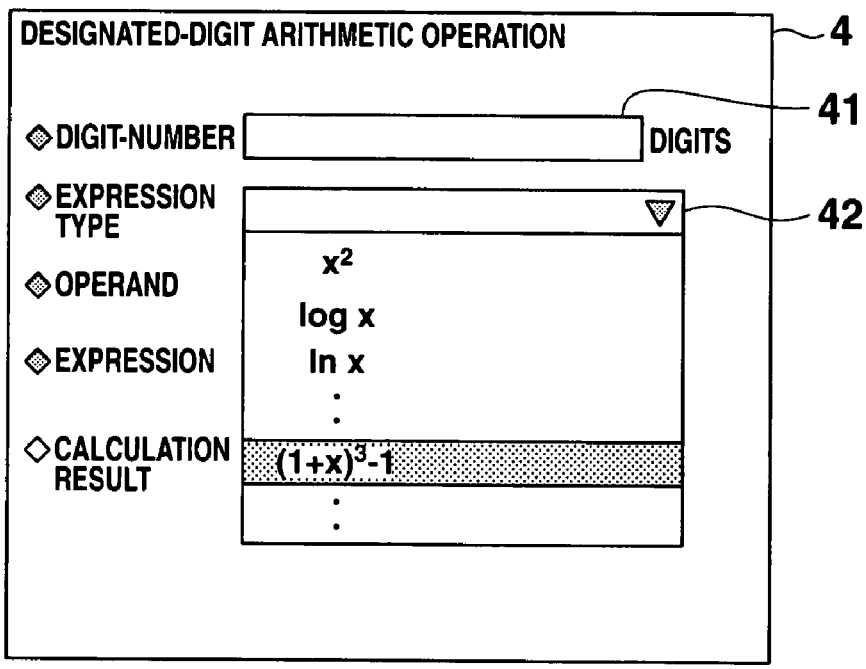
FIG. 3B is a diagram showing another example of an image displayed by the display device 4.

The boxes includes a digit-number box 41, a prepared-expression box 42, an operand box 43, an expression input box 44, and a result display box 45. The user inputs the number of digits (hereinafter referred to as digit-number) n in the digit-number box 41. As shown in FIG. 3B, a pull-down menu of the prepared-expression box 42 shows a variety of expressions prepared preliminarily. The user may select an arithmetic expression to be operated from among the prepared expressions. The user inputs an operand in the operand box 43. The user may directly input an arithmetic expression to be operated in the expression input box 44. The result display box 45 displays the result of the operation.

The CPU 20 controls the entire components of the graphing calculator 1 as shown in FIG. 2. The CPU 20 executes processing based on a preset program in response to an input instruction. The CPU 20 transmits an instruction or data to the functional components of the graphing calculator 1. Specifically, the CPU 20 reads out a program stored in the ROM 50 in response to an operation signal input from the input device 30 and executes processing corresponding to the read-out program. Then the CPU 20 appropriately outputs a display control signal to the display device 40 in order to display a processing result.

The ROM 50 stores a variety of programs and data. When the graphing calculator 1 is powered on, the graphing calculator 1 should be initialized. The ROM 50 stores a program and data required for the initialization. In addition, the ROM 50 stores a program and data required to execute arithmetic operation processing to be described later.

Figure 4:
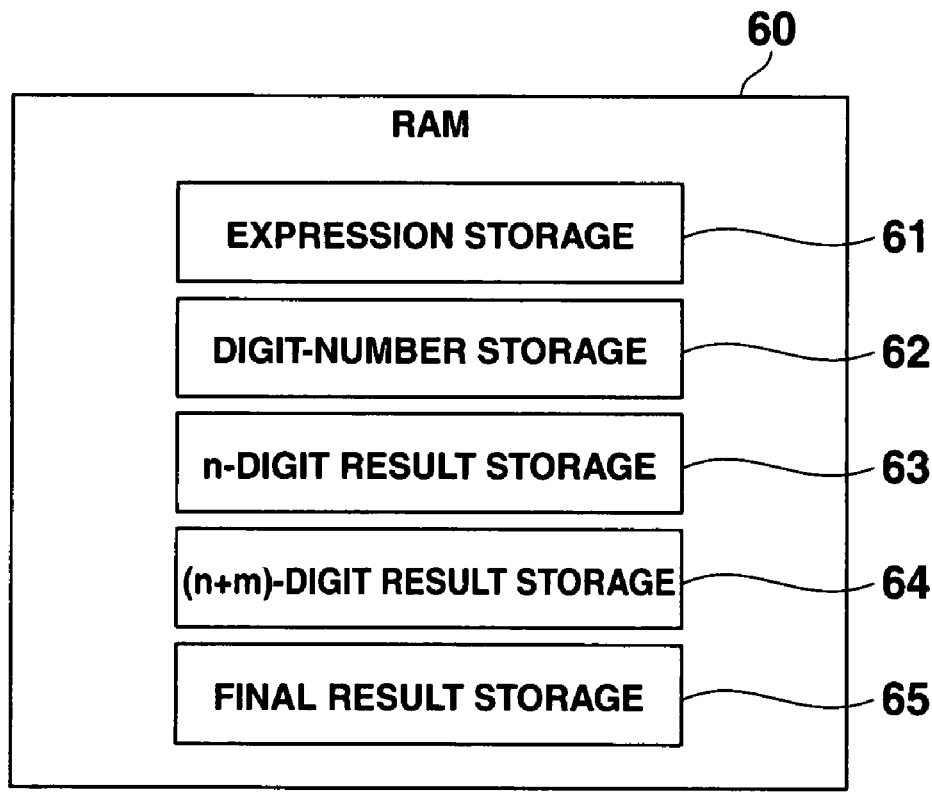
FIG. 4 is a diagram showing data configuration of a RAM 60.

The RAM 60 is provided as a work area for the CPU 20 and temporarily stores a variety of data. As shown in FIG. 4, the RAM 60 includes an expression storage 61, a digit-number storage 62, an n-digit result storage 63, an (n+m)-digit result storage 64, and a final result storage 65.

The expression storage 61 stores an arithmetic expression input by the user with the input device 30. The digit-number storage 62 stores the digit-number n (n is a positive integer) input by the user with the input device 30. The n-digit result storage 63 stores a calculation result obtained to an n-th digit by the decimal calculation unit 70. The (n+m)-digit result storage 64 stores a calculation result obtained to an (n+m)-th digit (m is a positive integer which satisfies m<n) by the decimal calculation unit 70. The final result storage 65 stores the final calculation result of an entire arithmetic expression.

The decimal calculation unit 70 shown in FIG. 2 performs a calculation in decimal system according to machine language instructions of a machine language program. The decimal calculation unit 70 obtains a result of the calculation to a designated digit. Hereinafter, a calculation result obtained to a j-th digit by the decimal calculation unit 70 is referred to as a j-digit result, and a calculation to obtain the j-digit result is referred to as a j-digit calculation. The decimal calculation unit 70 includes a program ROM 710. The program ROM 710 includes two storage areas 7101 and 7103. The storage area 7101 stores programs for obtaining a calculation result to the designated digit. The storage area 7103 stores a variety of arithmetic operation programs for a variety of arithmetic operators.

First Embodiment

An embodiment of the present invention will be described below.

A graphing calculator 1A according to the present embodiment corresponds to the above-described graphing calculator 1. As shown in FIG. 2, the graphing calculator 1A includes a ROM 50A as the above-described ROM 50.

Figure 5:
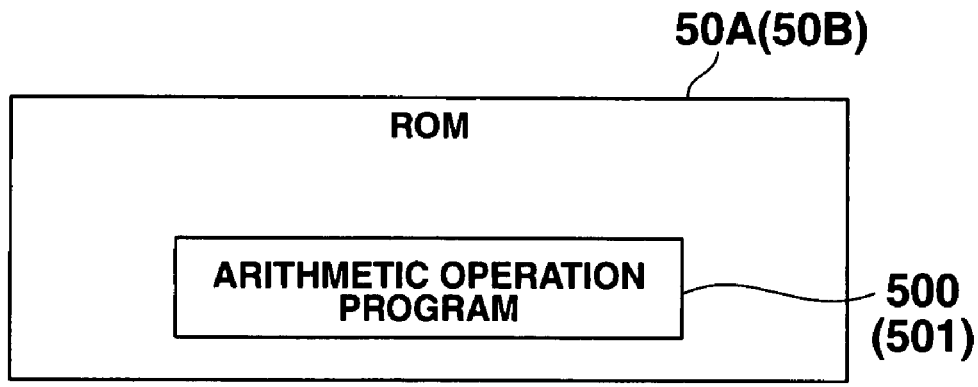
FIG. 5 is a diagram showing data configuration of a ROM 50.

The ROM 50A stores an arithmetic operation program 500 as shown in FIG. 5. The CPU 20 executes an arithmetic operation (see FIG. 6) to be described below based on the arithmetic operation program 500.

Figure 6:
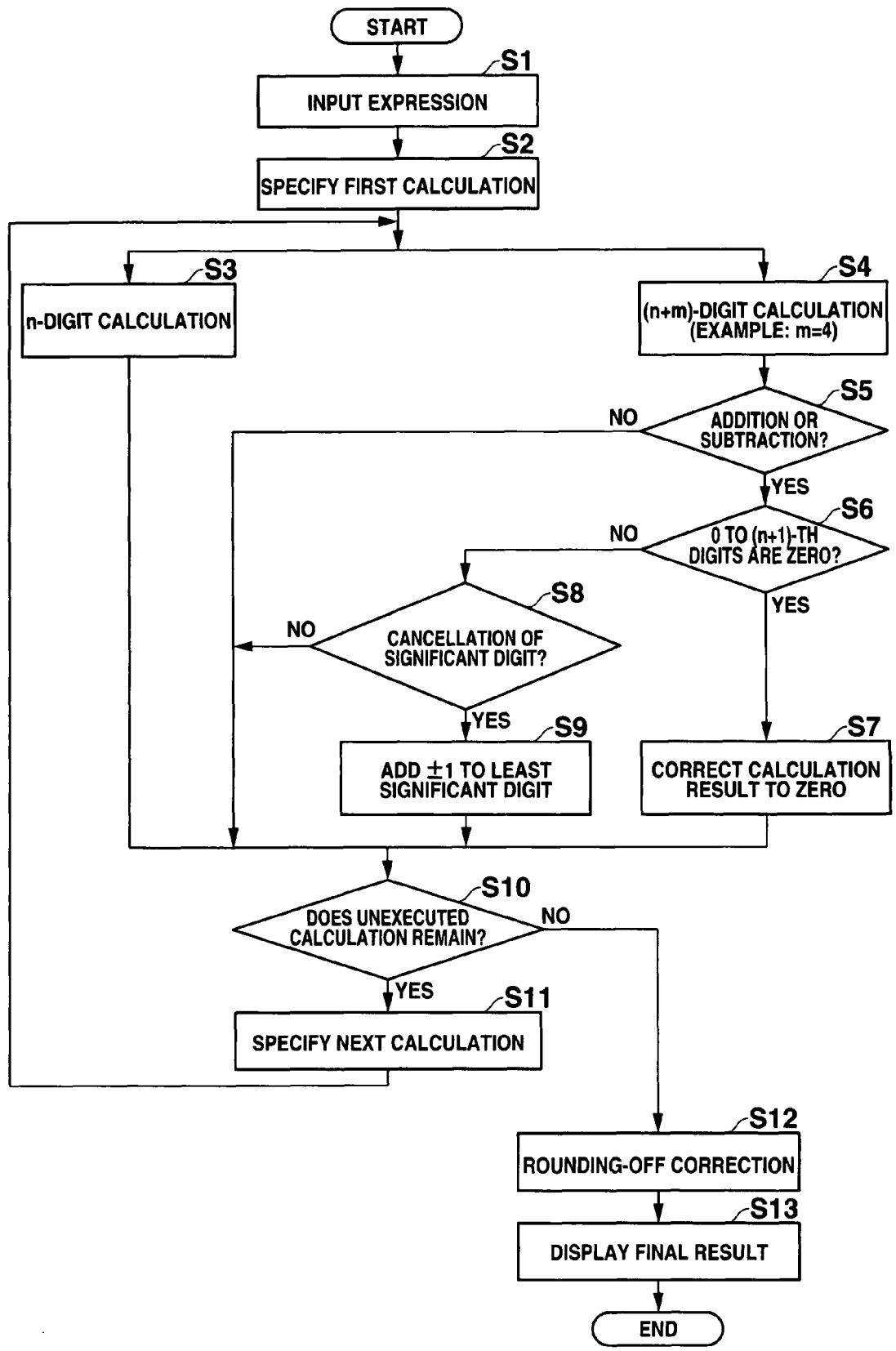
FIG. 6 is a flowchart of arithmetic operation processing according to the first embodiment.

FIG. 6 is a flowchart of the arithmetic operation according to the present embodiment. The CPU 20 reads out the arithmetic operation program 500, and the program 500 is executed in the graphing calculator 1A.

When the user inputs an arithmetic expression and a digit-number n with the input device 30, the CPU 20 stores the input expression into the expression storage 61 and the digit-number n into the digit-number storage 62 (step S1). The CPU 20 specifies a first calculation in the input expression (step S2). The first calculation is a calculation to be executed first in accordance with the mathematical rule.

The CPU 20 causes the decimal calculation unit 70 to obtain the n-digit result of the specified calculation (step S3). Namely, the CPU 20 generates a machine language program for executing the specified n-digit calculation. The decimal calculation unit 70 executes the specified calculation based on the generated program. The CPU 20 stores the obtained n-digit result of the specified calculation into the n-digit result storage 63.

The CPU 20 also causes the decimal calculation unit 70 to obtain the (n+m)-th digit result of the specified calculation (step S4). The CPU 20 generates a machine language program for executing the specified (n+m)-digit calculation. The decimal calculation unit 70 executes the specified calculation based on the generated program.

The CPU 20 determines whether or not the specified calculation is an addition or a subtraction (step S5). When the specified calculation is not an addition or a subtraction ("No" at step S5), the CPU 20 stores the (n+m)-digit result of the specified calculation as is in the (n+m)-digit result storage 64, and the flow advances to step S10. When the specified calculation is an addition or a subtraction ("Yes" at step S5), the CPU 20 determines whether or not upper n+p (p is a positive integer that satisfies p≦m) digits in the (n+m)-digit result are all zero (step S6). In the present embodiment, the CPU 20 determines whether or not the upper n+1 digits (p=1) are all zero.

When it is determined that the upper n+1 digits are all zero ("Yes" at step S6), the CPU 20 corrects the n-digit result and the (n+m)-digit result to zero (step S7). Both of the n-digit result storage 63 and the (n+m)-digit result storage 64 store zero as the result of the specified calculation.

When the specified calculation is an addition or a subtraction and the predetermined upper digits are all zero in the (n+m)-digit result, the n-digit result is corrected to zero. Accordingly, even when a slight arithmetic error is generated, the CPU 20 appropriately determines that the error should be corrected to zero. Therefore, a calculation which must result in zero, such as a subtraction between equivalent numerals, surely results in zero.

When it is determined at step S6 that there is a digit whose value is not zero in the upper n+p digits ("No" at step S6), the CPU 20 determines whether or not cancellation of a significant digit is brought about (step S8). That is, the CPU 20 determines whether or not the entire (n+m)-digit result is not zero and the most significant digit of the (n+m)-digit result is zero. When the CPU 20 determines that the cancellation is not brought about ("No" at step S8), i.e., when the entire (n+m)-digit result is zero or when the most significant digit of the (n+m)-digit result is not zero, the CPU 20 stores the (n+m)-digit result as is into the (n+m)-digit result storage 64. Then, the flow advances to step S10. When it is determined that the cancellation is brought about ("Yes" at step S8), the CPU 20 corrects the least significant digit of the (n+m)-digit result (step S9). That is, when it is determined that the entire (n+m)-digit result is not zero and the most significant digit of the (n+m)-digit result is zero, the CPU 20 adds +1 or −1 to the least significant digit of the (n+m)-digit result. Namely, +1 or −1 is added to the value of the (n+m)-th digit. The corrected (n+m)-digit result is stored in the (n+m)-digit result storage 64.

When the specified calculation is an addition or a subtraction and the cancellation of the significant digit is brought about (when all the digits are not zero and the most significant digit is zero in the (n+m)-digit result), the least significant digit of the (n+m)-digit result is added by +1 or −1. Even when the (n+m)-digit result is equivalent to the n-digit result, the former can be made different from the latter. Since the corrected (n+m)-digit result is used in subsequent calculations at step S11, an error due to the cancellation of the significant digit with respect to the corrected (n+m)-digit result is smaller than the error with respect to the n-digit result. Since the correction is performed such that merely +1 or −1 is added to the least significant digit, the difference is suppressed to minimum. The minimum difference prevents the correction from affecting a rounding-off correction at step S12 to be described later. When there remains an unexecuted subsequent calculation in the input expression, the decimal calculation unit 70 executes the subsequent calculation using the n-digit result and the corrected (n+m)-digit result. When the cancellation of the significant digit is brought about, an error resulting from the cancellation can propagate through subsequent calculations. However, due to the difference between the n-digit result and the (n+m)-digit result generated at step S9, an error contained in an (n+m)-digit result of the subsequent calculation is smaller compared with an error contained in an n-digit result of the subsequent calculation. If the result is rounded off, the n-digit result and the (n+m)-digit result are made equal to each other so that the (n+m)-digit calculation becomes unnecessary. In order to make use of "00" at other digits, +1 or −1 is added to the least significant digit of the (n+m)-digit result. Since the n-digit result and the (n+m)-digit result are different with regard to the intermediate digits "00" and the least significant digit, the result having more precise significant digits is obtained.

The CPU 20 determines whether or not all the calculations in the input arithmetic expression are executed (step S10). That is, the CPU 20 determines whether or not there remains any unexecuted calculation in the input expression. When there remains an unexecuted calculation ("Yes" at step S10), the CPU 20 specifies a calculation to be subsequently executed (step S11). The CPU 20 repeats the above-described processing of steps S3 to S10. When all of the calculations in the input arithmetic expression are executed, the entire result of the input expression can be derived.

When it is determined at step S10 that all the calculations in the input expression are executed and no calculation remains unexecuted ("No" at step S10), the CPU 20 executes rounding-off correction (step S12). In the present embodiment, the rounding-off correction of the (n+m)-digit result to the n-digit result is executed as follows. That is, the values of the respective digits in the (n+m)-digit result are compared with the corresponding digits in the n-digit result. The CPU 20 detects the most significant unequivalent digit. The (n+m)-digit result is rounded off to the most significant unequivalent digit. The rounded (n+m)-digit result is substituted into the n-digit result.

The CPU 20 stores the rounded n-digit result into the final result storage 65 as a final calculation result of the entire input expression. The CPU 20 causes the display device 40 to display the final calculation result (step S13). The CPU 20 terminates the arithmetic operation.

Now, specific operation examples (1) to (6) of the arithmetic operation will be described. In the description of the operation examples below, the value of "m" is 4.

(1) Arithmetic expression: $3\times\sqrt{7}-\sqrt{63}$, digit-number: n=7

FIG. 7A is a diagram conceptually showing an internal process executed by the graphing calculator 1A when the arithmetic expression "$3\times\sqrt{7}-\sqrt{63}$" and the digit-number "n=7" are input.

The user inputs the arithmetic expression "$3\times\sqrt{7}-\sqrt{63}$" in the expression input box 44 and the digit-number "n=7" to the digit-number box 41 (step S1 in FIG. 6). The CPU 20 specifies the multiplication "$3\times\sqrt{7}$" as the first calculation in the input expression (step S2 in FIG. 6). The decimal calculation unit 70 executes the 7-digit calculation of the specified multiplication (step S3 in FIG. 6). The decimal calculation unit 70 obtains "7.937253" as the 7-digit result. The obtained 7-digit result is stored into the n-digit result storage 63.

The decimal calculation unit 70 executes the 11-digit calculation of the specified multiplication "$3\times\sqrt{7}$" (step S4 in FIG. 6). The CPU 20 determines that the specified calculation is not an addition or a subtraction, but a multiplication ("No" at step S5 in FIG. 6). The 11-digit result "7.9372539333" is stored as is in the (n+m)-digit result storage 64.

The CPU 20 determines that the subtraction "(the result of $3\times\sqrt{7}$)$-\sqrt{63}$" remains unexecuted ("Yes" at step S10 in FIG. 6). The CPU 20 specifies the subtraction (step S11 in FIG. 6). The decimal calculation unit 70 executes the 7-digit calculation of the specified subtraction to obtain "$-1E-6$" as shown in FIG. 7A (step S3 in FIG. 6). The 7-digit result "$-1E-6$" is stored in the n-digit result storage 63. In the calculation result "$-1E-6$", "$-1$" indicates a mantissa and "$E-6$" indicates an exponent.

The decimal calculation unit 70 executes the 11-digit calculation of the specified subtraction to obtain "$1E-10$" as shown in FIG. 7A (step S4 in FIG. 6). The CPU 20 determines that the specified calculation is a subtraction ("Yes" at step S5 in FIG. 6). Thereafter, the CPU 20 determines that the upper 8 digits in the 11-digit result "$1E-10$" are all zero ("Yes" at step S6 in FIG. 6). The CPU 20 corrects the 7-digit and 11-digit results to zero and stores respectively the corrected results in the n-digit result storage 63 and the (n+m)-digit result storage 64 (step S7 in FIG. 6).

Thus, with respect to an addition or a subtraction in the input expression, when the predetermined upper digits of the (n+m)-digit result "$1E-10$" are all zero, the n-digit result "$-1E-6$" is corrected to zero. Therefore, when there appears the slight arithmetic error in the calculation result, the error is appropriately considered to be zero, and the calculation result is corrected to zero. Namely, the calculation result which should be zero, such as a subtraction between equivalent numerals, is reliably corrected to zero.

The CPU 20 then determines that all the calculations in the input expression are finished (no calculation remains unexecuted) ("No" at step S10 in FIG. 6). The CPU 20 executes the rounding-off correction (step S12 in FIG. 6). The 7-digit result "0" of the entire input arithmetic expression is displayed in the result display box 45 of the display device 40 (step S13 in FIG. 6). The CPU 20 then terminates the arithmetic operation.

(2) Arithmetic expression: $1-1\div3\times3$, digit-number: n=7

FIG. 7B is a diagram conceptually showing an internal process executed by the graphing calculator 1A when the arithmetic expression "$1-1\div3\times3$" and the digit-number "n=7" are input.

The user inputs the arithmetic expression "$1-1\div3\times3$" in the expression input box 44 and the digit-number "n=7" in the digit-number box 41 (step S1 in FIG. 6). The CPU 20 specifies the division "$1\div3\times3$" as the first calculation in the input expression (step S2 in FIG. 6). The decimal calculation unit 70 executes the 7-digit calculation of the specified division to obtain the 7-digit result (step S3 in FIG. 6). The obtained 7-digit result is stored into the n-digit result storage 63.

The decimal calculation unit 70 executes the 11-digit calculation of the specified division "$1\div3$" (step S4 in FIG. 6). The CPU 20 determines that the specified calculation is not an addition or a subtraction, but a division ("No" at step S5 in FIG. 6). The 11-digit result is stored as is in the (n+m)-digit result storage 64.

The CPU 20 determines that the multiplication "(the calculation result of $1\div3$)$\times3$" remains unexecuted ("Yes" at step S10 in FIG. 6). The CPU 20 specifies the multiplication (step S11 in FIG. 6). The decimal calculation unit 70 executes the 7-digit calculation of the specified multiplication (step S3 in FIG. 6). The 7-digit result "0.9999999" is stored in the n-digit result storage 63.

The decimal calculation unit 70 executes the 11-digit calculation of the specified multiplication (step S4 in FIG. 6). The CPU 20 determines that the specified calculation is not an addition or a subtraction, but a multiplication ("No" at step S5 in FIG. 6). The 11-digit result "0.99999999999" is stored as is in the (n+m)-digit result storage 64.

The CPU 20 determines that the subtraction "$1-$(the calculation result of $1\div3\times3$)" remains unexecuted ("Yes" at step S10 in FIG. 6). The CPU 20 specifies the subtraction (step S11 in FIG. 6). The decimal calculation unit 70 executes the 7-digit calculation of the specified subtraction to obtain "$1E-7$" as shown in FIG. 7B (step S3 in FIG. 6). The obtained 7-digit result "$1E-7$" is stored into the n-digit result storage 63.

The decimal calculation unit 70 executes the 11-digit calculation of the specified subtraction to obtain "$1E-11$" as shown in FIG. 7B (step S4 in FIG. 6). The CPU 20 determines that the specified calculation is a subtraction ("Yes" at step S5 in FIG. 6). Thereafter, the CPU 20 determines that the upper 8 digits in the 11-digit result "$1E-11$" are all zero ("Yes" at step S6 in FIG. 6). The CPU 20 corrects the 7-digit and 11-digit results to zero and stores the corrected results respectively in the n-digit result storage 63 and the (n+m)-digit result storage 64 (step S7 in FIG. 6).

Thus, with respect to an addition or a subtraction in the input expression, when the predetermined upper digits of the (n+m)-digit result "$1E-11$" are all zero, the n-digit result "$-1E-7$" is corrected to zero. Therefore, when there appears the slight arithmetic error in the calculation result, the error is appropriately considered to be zero, and the calculation result is corrected to zero. Namely, the calculation result which should be zero, such as a subtraction between equivalent numerals, is reliably corrected to zero.

The CPU 20 then determines that all the calculations in the input expression are finished (no calculation remains unexecuted) ("No" at step S10 in FIG. 6). The CPU 20 executes the rounding-off correction (step S12 in FIG. 6). The 7-digit result "0" of the entire input expression is displayed in the result display box 45 of the display device 40 (step S13 in FIG. 6). The CPU 20 then terminates the arithmetic operation.

(3) Arithmetic expression: $1-0.9999999$, digit-number: n=7

FIG. 7C is a diagram conceptually showing an internal process executed by the graphing calculator 1A when the arithmetic expression "$1-0.9999999$" and the digit-number "n=7" are input.

The user inputs the arithmetic expression "$1-0.9999999$" in the expression input box 44 and the digit-number "n=7" in the digit-number box 41 (step S1 in FIG. 6). The CPU 20 specifies the subtraction "$1-0.9999999$" as the first calculation in the input expression (step S2 in FIG. 6). The decimal calculation unit 70 executes the 7-digit calculation of the specified subtraction to obtain the 7-digit result "$1E-7$" as shown in FIG. 7C (step S3 in FIG. 6). The obtained 7-digit result "1E−7" is stored in the n-digit result storage 63.

The decimal calculation unit 70 executes the 11-digit calculation of the specified subtraction to obtain "1E−7" as shown in FIG. 7C (step S4 in FIG. 6). The CPU 20 determines that the specified calculation is a subtraction ("Yes" at step S5 in FIG. 6). Subsequently, the CPU 20 determines that there is a digit whose value is not zero in the upper 8 digits of the 11-digit result "1E−7" ("No" at step S6 in FIG. 6). The CPU 20 then determines whether or not the cancellation of the significant digit is brought about (step S8 in FIG. 6). The CPU 20 determines that the 11-digit result "1E−7" is not zero and the most significant digit of "1E−7" is zero, that is, the CPU 20 determines that the cancellation is brought about ("Yes" at step S8 in FIG. 6). The CPU 20 corrects the least significant digit of the 11-digit result "1E−7" (step S9 in FIG. 6). That is, the CPU 20 adds +1 or −1 to the 11th digit of the 11-digit result and stores the result of the addition "0.00000010001" or "0.00000009999" in the (n+m)-digit result storage 64.

The CPU 20 then determines that all the calculations in the input expression are finished (no calculation remains unexecuted) ("No" at step S10 in FIG. 6). The CPU 20 executes the rounding-off correction to obtain the 7-digit result "1E−7" (step S12 in FIG. 6). The rounded 7-digit result of the entire input expression "1E−7" is displayed in the result display box 45 of the display device 40 (step S13 in FIG. 6). The CPU 20 then terminates the arithmetic operation.

Thus, when the specified calculation is an addition or a subtraction and the cancellation of the significant digit is brought about, i.e., when the entire (n+m)-digit result is not zero and the most significant digit of the (n+m)-digit result is zero, the least significant digit of the (n+m)-digit result is corrected by adding +1 or −1 at step S9. Even when the n-digit and (n+m)-digit results are equivalent, the calculation results can be made different from each other. In addition, the difference is suppressed to minimum. Consequently, the minimum difference prevents the correction at step S9 from affecting the rounding-off correction at step S12.

(4) Arithmetic expression: (1+cos x)/x, for x=3.141593, digit-number: n=15

FIGS. 8A to 8D are diagrams conceptually showing an internal process executed by the graphing calculator 1A when the arithmetic expression "(1+cos x)/x, for x=3.141593", and the digit-number "n=15" are input.

The user selects the arithmetic expression "(1+cos x)/x" from the pull down menu of the prepared-expression box 42, the value of operand "x=3.141593" in the operand box 43, and the digit-number "n=15" in the digit-number box 41 (step S1 in FIG. 6). The CPU 20 specifies the cosine function "cos x" as the first calculation in the input expression (step S2 in FIG. 6). The decimal calculation unit 70 executes the 15-digit calculation of the cosine function to obtain the 7-digit result "−9.99999999999940E−01" as shown in FIG. 8A (step S3 in FIG. 6). The obtained 15-digit result "−9.99999999999940E−01" is stored in the n-digit result storage 63.

The decimal calculation unit 70 executes the 19-digit calculation of the specified cosine function to obtain "−9.999999999999400000E−01" (step S4 in FIG. 6). The CPU 20 determines that the specified calculation is not an addition or a subtraction but a cosine function ("No" at step S5 in FIG. 6). The 19-digit result "−9.999999999999400000E−01" is stored as is in the (n+m)-digit result storage 64.

The CPU 20 determines that the addition "1+cos x" remains unexecuted ("Yes" at step S10 in FIG. 6). The CPU 20 specifies the addition (step S11 in FIG. 6). The decimal calculation unit 70 executes the 15-digit calculation of the specified addition to obtain "6.0E−14" as shown in FIG. 8B (step S3 in FIG. 6). The obtained 15-digit result "6.0E−14" is stored into the n-digit result storage 63.

The decimal calculation unit 70 executes the 19-digit calculation of the specified addition to obtain "6.00000E−14" as shown in FIG. 8B (step S4 in FIG. 6). The CPU 20 determines that the specified calculation is an addition ("Yes" at step S5 in FIG. 6). Subsequently, the CPU 20 determines that there is a digit whose value is not zero in the upper 16 digits of the 19-digit result "6.00000E−14" ("No" at step S6 in FIG. 6). The CPU 20 determines whether or not the cancellation of the significant digit is brought about (step S8 in FIG. 6). The CPU 20 determines that the 19-digit result "6.00000E−14" is not zero and the most significant digit of "6.00000E−14" is zero, that is, the CPU 20 determines that the cancellation is brought about ("Yes" at step S8 in FIG. 6). The CPU 20 adds +1, in the present example, to the 19th digit of the 19-digit result and stores the addition result "6.00001E−14" in the (n+m)-digit result storage 64 (step S9 in FIG. 6). Consequently, even when the n-digit and (n+m)-digit results are equivalent, the calculation results can be made different to each other by the minimized difference.

The CPU 20 determines that the division "(the calculation result of 1+cos x)/x" remains unexecuted ("Yes" at step S10 in FIG. 6). The CPU 20 specifies the division (step S11 in FIG. 6). The decimal calculation unit 70 executes the 15-digit calculation of the specified division to obtain "1.90985910651061E−14" as shown in FIG. 8C (step S3 in FIG. 6). The obtained 15-digit result is stored in the n-digit result storage 63.

The decimal calculation unit 70 executes the 19-digit calculation of the specified division to obtain "1.909862289609125052E−14" as shown in FIG. 8C (step S4 in FIG. 6). The CPU 20 determines that the specified calculation is not an addition or a subtraction, but a division ("No" at step S5 in FIG. 6). The 19-digit result is stored as is in the (n+m)-digit result storage 64.

When the n-digit and (n+m)-digit results are used for the subsequent calculation, the (n+m)-digit result is corrected to be different from the n-digit result by minimum value at step S9. When the cancellation of the significant digit is brought about in the calculation result, an error resulting from the cancellation can propagate through subsequent calculation. Due to the difference made at step S9, an error contained in an (n+m)-digit result of the subsequent calculation can be smaller compared with an error contained in an n-digit result of the subsequent calculation.

The CPU 20 then determines that all the calculations in the input expression are finished (no calculation remains unexecuted) ("No" at step S10 in FIG. 6). The CPU 20 executes a rounding-off correction to obtain the 15-digit result of the entire input expression "1.90986E−14" as shown in FIG. 8D (step S12 in FIG. 6). The rounded 15-digit result "1.90986E−14" is displayed in the result display box 45 of the display device 40 (step S13 in FIG. 6). The CPU 20 then terminates the arithmetic operation.

(5) Arithmetic expression: (1+cos x)/x, for x=3.141593, digit-number: n=15

FIGS. 9A to 9C are diagrams conceptually showing an internal process executed by the graphing calculator 1A when the arithmetic expression "(1+cos x)/x, for x=3.141593", and the digit-number "n=15" are input. In the present operation example (5), the processing of steps S1 to S8 is the same as in the case of the above operation example (4). Instead of adding +1 at step S9 in FIG. 6, −1 is added to the 19th digit of the 19-digit result at step S9 in the present operation example.

As shown in FIG. 9A, the decimal calculation unit 70 executes the 19-digit calculation of the specified addition "1+cos x" to obtain "6.00000E−14" (step S4 in FIG. 6). The CPU 20 determines that the specified calculation is an addition ("Yes" at step S5 in FIG. 6). The CPU 20 determines that there is a digit whose value is not zero in the upper 16 digits of the 19-digit result "6.00000E−14" ("No" at step S6 in FIG. 6). The CPU 20 determines that the cancellation of the significant digit is brought about. That is, the CPU 20 determines that the 19-digit result is not zero and the most significant digit in the 19-digit result is zero ("No" at step S8 in FIG. 6). Subsequently, the CPU 20 adds −1 to the 19th digit of the 19-digit result and stores the addition result "5.99999E−14" in the (n+m)-digit result storage 64 (step S9 in FIG. 6). Consequently, even when the n-digit and (n+m)-digit results are equivalent, the calculation results can be made different to each other by the minimized difference.

The CPU 20 determines that the division "(the calculation result of 1+cos x)/x" remains unexecuted ("Yes" at step S10 in FIG. 6). The CPU 20 specifies the division (step S11 in FIG. 6). The decimal calculation unit 70 executes the 15-digit calculation of the specified division to obtain "1.90985910651061E−14" as shown in FIG. 9B (step S3 in FIG. 6). The obtained 15-digit result is stored in the n-digit result storage 63.

The decimal calculation unit 70 executes the 19-digit calculation of the specified division to obtain "1.90985592341210335E−14" as shown in FIG. 9C (step S4 in FIG. 6). The CPU 20 determines that the specified calculation is not an addition or a subtraction, but a division ("No" at step S5 in FIG. 6). The 19-digit result is stored as is in the (n+m)-digit result storage 64.

When the n-digit and (n+m)-digit results are used for the subsequent calculation, the (n+m)-digit result is corrected to be different from the n-digit result by minimum value at step S9. When the cancellation of the significant digit is brought about in the calculation result, an error resulting from the cancellation can propagate through the subsequent calculation. Due to the difference made at step S9, an error contained in an (n+m)-digit result of the subsequent calculation can be smaller compared with an error contained in an n-digit result of the subsequent calculation.

The CPU 20 then determines that all the calculations in the input expression are finished (no calculation remains unexecuted) ("No" at step S10 in FIG. 6). The CPU 20 executes a rounding-off correction to obtain the 15-digit result of the entire input expression "1.90986E−14" as shown in FIG. 9C (step S12 in FIG. 6). The rounded 15-digit result "1.90986E−14" is displayed in the result display box 45 of the display device 40 (step S13 in FIG. 6). The CPU 20 then terminates the arithmetic operation.

(6) Arithmetic expression: $\sqrt{5}-2.2360$, digit-number: 7

FIGS. 10A and 10B are diagrams conceptually showing an internal process executed by the graphing calculator 1A when the arithmetic expression "$\sqrt{5}-2.2360$" and digit-number "n=7" are input.

The user inputs the arithmetic expression "$\sqrt{5}-2.2360$" in the expression input box 44 and the digit-number "n=7" in the digit-number box 41 (step S1 in FIG. 6). The CPU 20 specifies the subtraction "$\sqrt{5}-2.2360$" as the first calculation in the input expression (step S2 in FIG. 6). The decimal calculation unit 70 executes the 7-digit calculation of the specified subtraction to obtain "0.000067" as shown in FIG. 10A (step S3 in FIG. 6). The obtained 7-digit calculation result "0.000067" is stored in the n-digit result storage 63.

The decimal calculation unit 70 executes the 11-digit calculation of the specified subtraction to obtain "0.0000679774" as shown in FIG. 10A (step S4 in FIG. 6). The CPU 20 determines that the specified calculation is a subtraction ("Yes" at step S5 in FIG. 6). Subsequently, the CPU 20 determines that there is a digit whose value is not zero in the upper 8 digits of the 11-digit result "0.0000679774" ("No" at step S6 in FIG. 6). The CPU 20 then determines whether or not the cancellation of the significant digit is brought about (step S8 in FIG. 6). The CPU 20 determines that the 11-digit result "0.0000679774" is not zero and the most significant digit of "0.0000679774" is zero, that is, the CPU 20 determines that the cancellation is brought about ("Yes" at step S8 in FIG. 6). The CPU 20 corrects the least significant digit of the 11-digit result (step S9 in FIG. 6). As shown in FIG. 10A, the CPU 20 adds +1, in the present example, to the 11th digit of the 11-digit result "0.0000679774" and stores the result of the addition "0.0000679775" in the (n+m)-digit result storage 64.

The CPU 20 then determines that all the calculations in the input expression are finished (no calculation remains unexecuted) ("No" at step S10 in FIG. 6). The CPU 20 executes the rounding-off correction to obtain the final 7-digit result "0.000068" as shown in FIG. 10B (step S12 in FIG. 6). The final 7-digit result "0.000068" is displayed in the result display box 45 of the display device 40 (step S13 in FIG. 6). The CPU 20 then terminates the arithmetic operation.

Thus, with respect to an addition or a subtraction in the input expression, when the cancellation of the significant digit is brought about, i.e., when the entire (n+m)-digit result is not zero and the most significant digit of the (n+m)-digit result is zero, the least significant digit of the (n+m)-digit result is corrected by adding +1 or −1 at step S9. Even when the n-digit and (n+m)-digit results are equivalent, the calculation results can be made different from each other. In addition, the difference is suppressed to minimum. Consequently, the minimum difference prevents the correction at step S9 from affecting the rounding-off correction at step S12.

As described above, in the present embodiment, when the predetermined upper digits in the (n+m)-digit result of an addition or a subtraction, the n-digit and (n+m)-digit calculation results are corrected to zero at step S7 in FIG. 6, as described in the specific operation examples (1) and (2). Thus, when the slight arithmetic error is generated, it can be appropriately determined that the error should be corrected to zero. Therefore, compared to the conventional calculator, which cannot determine whether or not to correct the slight error to zero, the graphing calculator 1A according to the present embodiment can prevent reduction of the arithmetic precision caused by the accumulated errors. Thereby, the arithmetic precision is improved.

Further, as shown in steps S2 to S11 in FIG. 6, when the input arithmetic expression contains additions and subtractions, the correction to make the calculation result to zero is executed, if necessary, for each addition or subtraction at step S7. Thereby, the arithmetic precision can be reliably improved.

Further, as shown in step S9 in FIG. 6, with respect to an addition or a subtraction in the input arithmetic expression, when the cancellation of the significant digit is brought about, i.e., when the entire (n+m)-digit result is not zero and the most significant digit of the (n+m)-digit result is zero, the least significant digit of the (n+m)-digit result is corrected by addition of ±1. When the n-digit and (n+m)-digit results are equivalent, the calculation results can be made different from each other. In addition, the difference is suppressed to minimum. Consequently, as shown in the operation examples (4) and (5), when the n-digit and (n+m)-digit results are used for a subsequent calculation, due to the difference generated at step S9, an error contained in an (n+m)-digit result of the subsequent calculation is smaller compared with an error contained in an n-digit result of the subsequent calculation. The minimum difference prevents the correction at step S9 from affecting the rounding-off correction at step S12. On the other hand, as shown in the specific operation examples (3) and (6), when the result corrected at step S9 is used as is for the rounding-off correction at step S12, the difference suppressed to minimum prevents the correction at step S9 from affecting the result of the rounding-off correction at step S12.

Furthermore, as described in the operation examples (1) to (6), the rounding-off correction at step S12 in FIG. 6 improves the arithmetic precision.

Second Embodiment

The second embodiment of the calculation apparatus according to the present invention will be described with reference to FIGS. 11 to 12C. The same portions as those of the first embodiment will be indicated in the same reference numerals and their detailed description will be omitted.

A graphing calculator 1B according to the present embodiment corresponds to the graphing calculator 1. As shown in FIG. 2, the graphing calculator 1B includes a ROM 50B as the ROM 50.

The ROM 50B stores an arithmetic operation program 501 as shown in FIG. 5. The CPU 20 executes an arithmetic operation (see FIG. 11) to be described below based on the arithmetic operation program 501.

Figure 11:
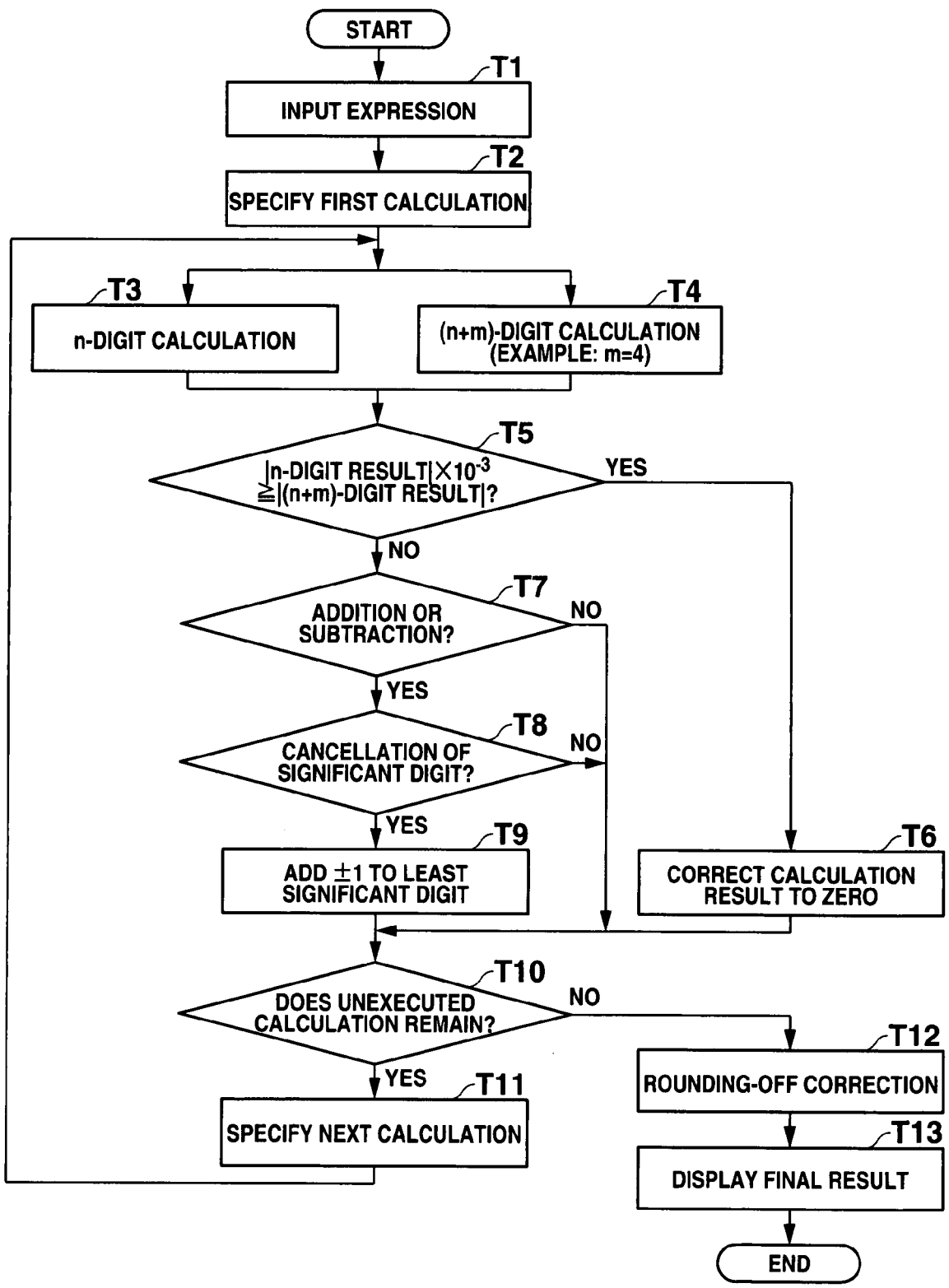
FIG. 11 is a flowchart of arithmetic operation processing according to the second embodiment.

FIG. 11 is a flowchart of the arithmetic operation according to the present embodiment. The CPU 20 reads out the arithmetic program 501, and the read-out program 501 is executed in the graphing calculator 1B.

When the user inputs an arithmetic expression and a digit-number n with the input device 30, the CPU 20 stores the input expression into the expression storage 61 and the digit-number n into the digit-number storage 62 (step T1). The CPU 20 specifies a first calculation in the input expression (step T2). The first calculation is a calculation to be executed first in accordance with the mathematical rule.

The CPU 20 causes the decimal calculation unit 70 to obtain the n-digit and (n+m)-digit results of the specified calculation (steps T3 and T4). Namely, the CPU 20 generates a machine language program for executing the specified n-digit and (n+m)-digit calculations. The decimal calculation unit 70 executes the specified calculations based on the generated program. The CPU 20 stores the obtained n-digit result of the specified calculation into the n-digit storage 63.

The CPU 20 determines whether or not the absolute value of the (n+m)-digit result is equal to or smaller than a product of the absolute value of the n-digit result and a predetermined factor (step T5). In the present embodiment, the predetermined factor is $10^{-3}$.

In step T5, when it is determined that the absolute value of the (n+m)-digit result is equal to or smaller than the product of the absolute value of the n-digit result and the predetermined factor "$10^{-3}$" ("Yes" at step T5), the CPU 20 sets the n-digit result and the (n+m)-digit result to zero (step T6). Both of the n-digit result storage 63 and the (n+m)-digit result storage 64 store zero as the result of the specified calculation. Accordingly, a calculation result which should result in zero, such as a calculation whose result becomes closer to zero when the digit-number becomes larger, reliably results in zero.

In step T5, when it is determined that the absolute value of the (n+m)-digit result is larger than the product of the absolute value of the n-digit result and the predetermined factor "$10^{-3}$" ("No" at step T5), the CPU 20 determines whether or not the specified calculation is an addition or a subtraction (step T7). When the specified calculation is not an addition or subtraction ("No" at step T7), the CPU 20 stores the (n+m)-digit result as is in the (n+m)-digit result storage 64, and the flow advances to step T10 to be described later. When the specified calculation is an addition or a subtraction ("Yes" at step T7), the flow advances to step T8. In step T8, the CPU 20 determines whether or not the cancellation of the significant digit is brought about. That is, the CPU 20 determines whether or not the entire (n+m)-digit result is not zero and the most significant digit of the (n+m)-digit result is zero.

In step T8, when the CPU 20 determines that the cancellation is not brought about ("No" at step T8), i.e., when the entire (n+m)-digit result is zero or when the most significant digit of the (n+m)-digit result is not zero, the CPU 20 stores the (n+m)-digit result as is in the (n+m)-digit storage 64. When it is determined that the cancellation is brought about ("Yes" at step T8), the CPU 20 corrects the least significant digit of the (n+m)-digit result (step T9). That is, when it is determined that the entire (n+m)-digit result is not zero and the most significant digit of the (n+m)-digit result is zero, the CPU 20 adds +1 or −1 to the least significant digit of the (n+m)-digit result. The corrected (n+m)-digit result is stored in the (n+m)-digit result storage 64.

When the specified calculation is an addition or a subtraction and the cancellation of a significant digit is brought about (when all the digits are not zero and the most significant digit is zero in the (n+m)-digit result), the least significant digit of the (n+m)-digit result is added by +1 or −1. Even when the (n+m)-digit result is equivalent to the n-digit result, the former can be made different from the latter. Since the corrected (n+m)-digit result is used in subsequent calculations at step T11, an error due to the cancellation of the significant digit with respect to the corrected (n+m)-digit result is smaller than the error with respect to the n-digit result. Since the correction is performed such that merely +1 or −1 is added to the least significant digit, the difference is suppressed to minimum. The minimum difference prevents the correction from affecting a rounding-off correction at step T12 to be described below. When there remains an unexecuted subsequent calculation in the input expression, the decimal calculation unit 70 executes the subsequent calculation using the n-digit result and the corrected (n+m)-digit result. When the cancellation of the significant digit is brought about in the calculation result, an error resulting from the cancellation can propagate through subsequent calculations. Due to the difference generated at step T9, an error contained in an (n+m)-digit result of the subsequent calculation is smaller compared with an error contained in an n-digit result of the subsequent calculation.

The CPU 20 determines whether or not all the calculations in the input arithmetic expression are executed (step T10). That is, the CPU 20 determines whether or not there remains any unexecuted calculation in the input expression. When there remains an unexecuted calculation ("Yes" at step T10), the CPU 20 specifies a calculation to be subsequently executed (step T11). The CPU 20 repeats the above-described processing of steps T3 to T10. When all of the calculations in the input arithmetic expression are executed, the entire result of the input expression can be derived.

When it is determined at step S10 that all the calculations in the input expression are executed and no calculation remains unexecuted ("No" at step T10), the CPU 20 executes rounding-off correction (step T12). In the present embodiment, the rounding-off correction is executed as follows. That is, the values of the respective digits in the (n+m)-digit result are compared with the corresponding digits in the n-digit result. The CPU 20 detects the most significant unequivalent digit.

The (n+m)-digit result is rounded off to the most significant unequivalent digit. The rounded (n+m)-digit result is substituted into the n-digit result.

The CPU 20 stores the rounded n-digit result into the final result storage 65 as a final calculation result of the entire input expression. The CPU 20 causes the display device 40 to display the final calculation result (step T13). The CPU 20 terminates the arithmetic operation.

Now, a specific operation example (7) of the arithmetic operation will be described. In the description of the specific operation example below, the value of "m" is 4.

(7) Arithmetic expression: sin(π×99), digit-number: n=7

FIGS. 12A to 12C are diagrams conceptually showing an internal process executed by the graphing calculator 1B when the arithmetic expression "sin(π×99)" and the digit-number "n=7" are input.

The user inputs the arithmetic expression "sin(π×99)" in the expression input box 44 and the digit-number "n=7" in the digit-number box 41 (step T1 in FIG. 11). The CPU 20 specifies the multiplication "π×99" as the first calculation in the input expression (step T2 in FIG. 11). As shown in FIG. 12A, the decimal calculation unit 70 executes the 7-digit and 11-digit calculations of the specified multiplication (steps T3 and T4 in FIG. 11). The decimal calculation unit 70 obtains "311.0177" as the 7-digit result. The obtained 7-digit result is stored into the n-digit result storage 63.

The CPU 20 determines that the absolute value of the (n+m)-digit result is larger than a product of the absolute value of the n-digit result and the factor $10^{-3}$ ("No" at step T5 in FIG. 11). The CPU 20 then determines that the specified calculation is not an addition or a subtraction but a multiplication ("No" at step T7 in FIG. 11). The 11-digit result "1311.01767271" is stored in the (n+m)-digit result storage 64.

The CPU 20 determines that the sine function "sin (the calculation result of π×99)" remains unexecuted ("Yes" at step T10 in FIG. 11). The CPU 20 specifies the sine function (step T11 in FIG. 11). The decimal calculation unit 70 executes the 7-digit and 11-digit calculations of the sine function (steps T3 and T4 in FIG. 11). The decimal calculation unit 70 obtains "−2.733999E−5" as the 7-digit result, as shown in FIG. 12A. The obtained 7-digit result "−2.733999E−5" is stored in the n-digit result storage 63.

As shown in FIG. 12B, the CPU 20 determines that the absolute value of the 11-digit result is smaller than a product of the absolute value of the n-digit result and the factor $10^{-3}$ ("Yes" at step T5 in FIG. 11). The CPU 20 sets 7-digit and the 11-digit results to zero as shown in FIG. 12C (step T6 in FIG. 11). Both of the n-digit result storage 63 and the (n+m)-digit result storage 64 store zero as the result of the specified sin function.

When it is determined that the absolute value of the (n+m)-digit result is equal to or smaller than the product of the absolute value of the n-digit result and the predetermined factor "$10^{-3}$", the n-digit result is set to zero. Accordingly, even when there appears a slight error, the CPU 20 appropriately determines that the error should be corrected to zero. The CPU 20 then corrects the calculation results to zero. Therefore, a calculation which must result in zero, such as a calculation whose result becomes closer to zero when the digit-number becomes larger, surely results in zero.

The CPU 20 then determines that there remains no unexecuted calculation ("No" at step T10 in FIG. 11). The CPU 20 executes the rounding-off correction (step T12 in FIG. 11). The 7-digit result "0" of the entire input expression is displayed in the result display box 45 of the display device 40 (step T13 in FIG. 11). The CPU 20 then terminates the arithmetic operation.

As described above, in the present embodiment, when it is determined that the absolute value of the (n+m)-digit result is equal to or smaller than the product of the absolute value of the n-digit result and the predetermined factor "$10^{-3}$", the n-digit result is set to zero. Accordingly, even when there appears a slight arithmetic error, the CPU 20 appropriately determines that the error should be corrected to zero. The CPU 20 then corrects the calculation results to zero at step T7 in FIG. 11, as described in the specific operation example (7). Therefore, compared to the conventional calculator, which cannot determine whether or not to correct the slight error to zero, the graphing calculator 1B according to the present embodiment can prevent reduction of the arithmetic precision caused by accumulated errors. Thereby, the arithmetic precision is improved.

Further, as shown in steps T2 to T11 in FIG. 11, the correction to make the calculation result to be zero is executed for each addition or subtraction, if necessary, at step T7. Thereby, the arithmetic precision can be reliably improved.

Further, as shown in step T9 in FIG. 11, with respect to an addition or a subtraction in the input arithmetic expression, when the cancellation of the significant digit is brought about, i.e., when the entire (n+m)-digit result is not zero and the most significant digit of the (n+m)-digit result is zero, the least significant digit of the (n+m)-digit result is corrected by addition of ±1. When the n-digit and (n+m)-digit results are equivalent, the calculation results can be made different from each other. In addition, the difference is suppressed to minimum. Consequently, when the n-digit and (n+m)-digit results are used for a subsequent calculation, due to the difference generated at step T9, an error contained in an (n+m)-digit result of the subsequent calculation is smaller compared with an error contained in an n-digit result of the subsequent calculation. The minimum difference prevents the correction at step T9 from affecting the rounding-off correction at step T12. On the other hand, when the result corrected at step T9 is used as is for the rounding-off correction at step T12, the difference suppressed to minimum prevents the correction at step T9 from affecting the result of the rounding-off correction at step T12.

Furthermore, the rounding-off correction at step T12 in FIG. 6 improves the arithmetic precision.

The present invention is not limited to the above embodiments. Various improvements and design modifications may be made without departing from the spirit of the present invention.

For example, in the description of the first and second embodiments, the present invention is applied to the graphing calculator. However, the present invention may be applied to another electronics device such as a calculator without a graph drawing function, a personal computer, or a personal digital assistant (PDA).

Figure 13:
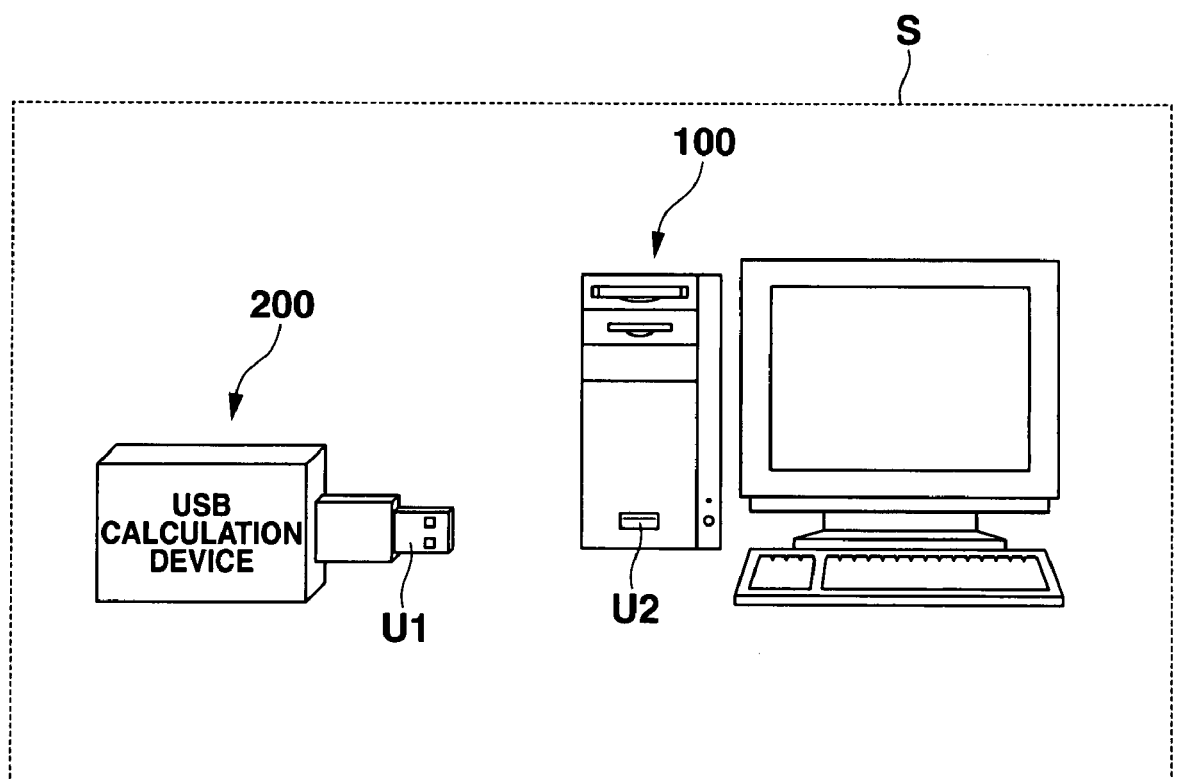
FIG. 13 is a diagram showing an example of an arithmetic operation system.

In the above description, the decimal calculation unit 70 is housed in the electronics device (in the above embodiments, the graphing calculator 1). However, as shown in FIG. 13, the decimal calculation unit 70 may be removable. FIG. 13 shows an arithmetic operation system S serving as the calculation apparatus according to the present invention. The arithmetic operation system S includes a personal computer 100 and a calculation device 200. The calculation device 200 contains the decimal calculation unit 70. A terminal U1 of the calculation device 200 is connected to a Universal Serial Bus (USB) port U2 of the personal computer 100 for data communication.

Furthermore, in the above description, at steps S12 and T12 of the rounding-off correction the digits of the (n+m)-digit result are compared with the digits of the n-digit result. However, the n-digit result is merely replaced by the (n+m)-digit result which is rounded off to the n digits. Therefore, the comparison processing between the n-digit result and the (n+m)-digit result can be eliminated and the processing can be simplified.

Moreover, in the above description, the display device 40 displays the n-digit result. However, the n-digit result and the (n+m)-digit result may be simultaneously displayed.

What is claimed is:

1. A calculation apparatus comprising:
   an input device configured to input a first number of digits and an arithmetic expression which includes at least one calculation;
   a calculator configured to execute a calculation included in the arithmetic expression input by the input device to obtain first and second calculation results of the first number of digits and a second number of digits which is larger than the first number of digits;
   a detection unit configured to detect that the calculation executed by the calculator is an addition or a subtraction; and
   a zero correction unit configured to perform a zero correction such that the first calculation result is corrected to zero when the detection unit detects that the calculation is an addition or a subtraction and values of predetermined upper digits of the second calculation result are zero.

2. The calculation apparatus according to claim 1, wherein, the arithmetic expression includes calculations;
   the zero correction unit corrects the second calculation result to zero when the detection unit detects that the calculation is an addition or a subtraction and the values of the predetermined upper digits of the second calculation result are zero, and
   the calculation apparatus further comprising:
   an arithmetic expression result calculation unit configured to calculate first and second results of the arithmetic expression of the first number of digits and the second number of digits based on the first and second calculation results for the calculations obtained by the calculator and results of correction performed by the zero correction unit; and
   a rounding correction unit configured to round off the second result of the arithmetic expression to a digit which is a most significant digit which varies between the first result of the arithmetic expression and the second result of the arithmetic expression.

3. The calculation apparatus according to claim 1, further comprising:
   a specifying unit configured to specify a calculation in the arithmetic expression in accordance with a predetermined mathematical rule, wherein
   the calculator executes the calculation specified by the specifying unit.

4. The calculation apparatus according to claim 1, wherein the second number of digits is larger than the first number of digits by four.

5. The calculation apparatus according to claim 1, wherein a digit number of the predetermined upper digits of the second calculation result is the first number of digit plus one.

6. A computer program product comprising a computer readable medium configured to store program instructions for execution on a computer system enabling the computer system to perform:
   inputting a first number of digits and an arithmetic expression which includes at least one calculation;
   executing a calculation included in the input arithmetic expression to obtain first and second calculation results of the first number of digits and a second number of digits which is larger than the first number of digits;
   detecting that the executed calculation is an addition or a subtraction; and
   performing a zero correction such that the first calculation result is corrected to zero when it is detected that the calculation is an addition or a subtraction and values of predetermined upper digits of the second calculation result are zero.

* * * * *